(12) United States Patent
Alano (10) Patent No.: US 11,583,812 B2
(45) Date of Patent: Feb. 21, 2023

(54) MIXER ASSEMBLY FOR VEHICLE EXHAUST SYSTEM

(71) Applicant: Faurecia Emissions Control Technologies, USA, LLC, Columbus, IN (US)

(72) Inventor: Eduardo Alano, Colubmus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 0 days.

(21) Appl. No.: 17/334,706

(22) Filed: May 29, 2021

(65) Prior Publication Data

US 2022/0379272 A1     Dec. 1, 2022

(51) Int. Cl.
     *B01F 25/312*      (2022.01)
     *F01N 3/28*      (2006.01)
     (Continued)

(52) U.S. Cl.
     CPC ........ *B01F 25/312* (2022.01); *B01F 23/2132* (2022.01); *F01N 3/2892* (2013.01); *B01F 25/312512* (2022.01); *F01N 3/2066* (2013.01)

(58) Field of Classification Search
     CPC ............ B01F 25/312; B01F 25/312512; B01F 23/2132; B01F 3/04049; B01F 5/0473;
     (Continued)

(56) References Cited

U.S. PATENT DOCUMENTS 9,828,897 B2   11/2017   Alano
9,995,193 B2   6/2018   Alano et al.
(Continued)

FOREIGN PATENT DOCUMENTS

WO      2018226626 A1     12/2018

*Primary Examiner* — Devon C Kramer
*Assistant Examiner* — Kelsey L Stanek
(74) *Attorney, Agent, or Firm* — Carlson, Gaskey & Olds, P.C.

(57) ABSTRACT

A mixer for a vehicle exhaust gas system includes a mixer housing defining an internal cavity and having a mixer inlet configured to receive exhaust gas and a mixer outlet to direct exhaust gas to downstream exhaust components. A flow device is configured to receive the exhaust gas from the mixer inlet and to facilitate mixing of the exhaust gas and a reductant introduced into the first flow device. The flow device comprises a Venturi body centered on a body center axis, and the Venturi body comprises a body inlet configured to receive the exhaust gas from the mixer inlet and a body outlet configured to provide the exhaust gas to the mixer outlet. The Venturi body also includes a louver extending from an internal surface of the mixer housing to a distal edge that is downstream of the body outlet. An upstream vane is positioned within the Venturi body proximate the body inlet and is coupled to an upstream vane hub that is centered on an upstream vane hub axis. A downstream vane is positioned within the Venturi body proximate the body outlet and is coupled to a downstream vane hub that is centered on a downstream vane hub axis. The upstream vane hub axis is radially offset from the body center axis by an offset distance and/or the downstream vane hub axis is radially offset from the body center axis by an offset distance.

24 Claims, 5 Drawing Sheets

(51) Int. Cl.
*B01F 23/213* (2022.01)
*F01N 3/20* (2006.01)

(58) Field of Classification Search
CPC .... B01F 5/0485; B01F 5/0608; B01F 5/0619; B01F 5/0659; B01F 5/0688; F01N 3/2066; F01N 3/2892; F01N 3/106; F01N 3/208; F01N 3/2803; F01N 9/00; F01N 2240/20; F01N 2240/40; F01N 2470/30; F01N 2610/02; F01N 2610/1433; F01N 2610/1453; F01N 2610/146
USPC .......................................................... 261/76
See application file for complete search history.

(56) References Cited

U.S. PATENT DOCUMENTS

| | | | |
|---|---|---|---|
| 10,632,430 B1 * | 4/2020 | Liu | F01N 3/2066 |
| 11,136,910 B2 * | 10/2021 | Liu | F01N 3/2892 |
| 2006/0191254 A1 * | 8/2006 | Bui | B01F 25/3131 60/286 |
| 2018/0078912 A1 * | 3/2018 | Yadav | F01N 13/009 |
| 2020/0269189 A1 | 8/2020 | Alano et al. | |

* cited by examiner

MIXER ASSEMBLY FOR VEHICLE EXHAUST SYSTEM

TECHNICAL FIELD

The present application relates generally to the field of vehicle exhaust systems for internal combustion engines, and more particularly to a mixer used in such exhaust systems.

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into the exhaust stream via an injection valve. A mixer is used to mix the introduced reductant with the exhaust gas flow.

SUMMARY

In one exemplary embodiment, a mixer for a vehicle exhaust gas system includes a mixer housing defining an internal cavity and having a mixer inlet configured to receive exhaust gas and a mixer outlet to direct exhaust gas to downstream exhaust components. A flow device is configured to receive the exhaust gas from the mixer inlet and to facilitate mixing of the exhaust gas and a reductant introduced into the first flow device. The flow device comprises a Venturi body centered on a body center axis, and the Venturi body comprises a body inlet configured to receive the exhaust gas from the mixer inlet and a body outlet configured to provide the exhaust gas to the mixer outlet. The Venturi body also includes a louver extending from an internal edge of the mixer housing to a distal edge that is downstream of the body outlet. An upstream vane is positioned within the Venturi body proximate the body inlet and is coupled to an upstream vane hub that is centered on an upstream vane hub axis. A downstream vane is positioned within the Venturi body proximate the body outlet and is coupled to a downstream vane hub that is centered on a downstream vane hub axis. The upstream vane hub axis is radially offset from the body center axis by an offset distance and/or the downstream vane hub axis is radially offset from the body center axis by an offset distance.

In a further non-limiting embodiment of the foregoing mixer, the flow device includes a funneling edge at the body inlet that is spaced apart from an inner surface of the mixer housing in a radial direction, and wherein the funneling edge is configured to direct a majority of the exhaust gases from the mixer inlet into the Venturi body.

In a further non-limiting embodiment of any of the foregoing mixers, the funneling edge extends in a direction that is perpendicular to the body center axis, and wherein the louver is at an offset angle relative to the funneling edge.

In a further non-limiting embodiment of any of the foregoing mixers, the offset angle is between 40 and 60 degrees.

In a further non-limiting embodiment of any of the foregoing mixers, the flow device includes a shroud at the body outlet, and wherein the louver is free from contact with the shroud.

In a further non-limiting embodiment of any of the foregoing mixers, the louver has a first edge that is fixed to the internal surface of the mixer housing and extends to the distal edge that is downstream of the body outlet.

In a further non-limiting embodiment of any of the foregoing mixers, the second edge is downstream of the first edge.

In another example embodiment, a mixer for a vehicle exhaust gas system includes a mixer housing defining an internal cavity and having a mixer inlet configured to receive exhaust gas and a mixer outlet to direct exhaust gas to downstream exhaust components. A flow device is configured to receive the exhaust gas from the mixer inlet and facilitates mixing of the exhaust gas and a reductant introduced into the first flow device. The flow device comprises a Venturi body centered on a body center axis, and the Venturi body comprises a body inlet configured to receive the exhaust gas from the mixer inlet and a body outlet configured to provide the exhaust gas to the mixer outlet. A louver extends from the mixer housing at a non-perpendicular angle from an internal surface of the mixer housing. An upstream vane is positioned within the Venturi body proximate the body inlet and is coupled to an upstream vane hub that is centered on an upstream vane hub axis and radially offset from the body center axis by an offset distance, the first upstream vane configured to facilitate swirling of the exhaust gas within the Venturi body.

In another example embodiment, mixer for a vehicle exhaust gas system includes a mixer housing defining an internal cavity and having a mixer inlet configured to receive exhaust gas and a mixer outlet to direct exhaust gas to downstream exhaust components. A flow device Is configured to receive the exhaust gas from the mixer inlet and facilitates mixing of the exhaust gas and a reductant introduced into the first flow device. The flow device comprises a Venturi body centered on a body center axis, and the Venturi body comprises a body inlet configured to receive the exhaust gas from the mixer inlet and a body outlet configured to provide the exhaust gas to the mixer outlet. A louver extends from the mixer housing at a non-perpendicular angle from an internal surface of the mixer housing. A downstream vane is positioned within the Venturi body proximate the body outlet and is coupled to a downstream vane hub that is centered on a downstream vane hub axis and is radially offset from the body center axis by an offset distance, the downstream vane configured to facilitate swirling of the exhaust gas downstream of the body outlet.

BRIEF DESCRIPTION OF THE DRAWINGS

The details of one or more implementations are set forth in the accompanying drawings and the description below. Other features, aspects, and adVantages of the disclosure will become apparent from the description, the drawings, and the claims, in which:

DETAILED DESCRIPTION

Figure 1:
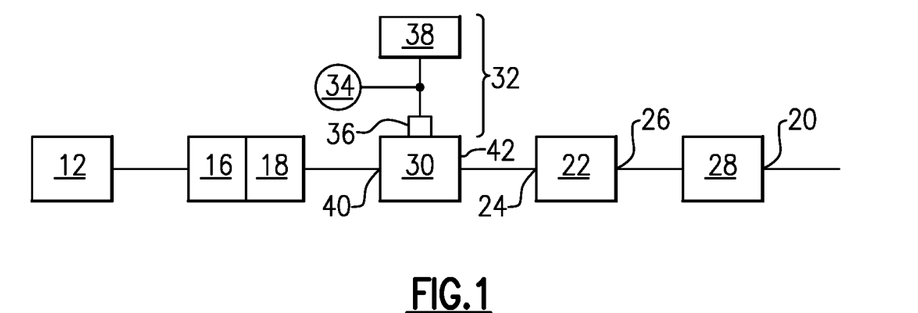
FIG. 1 schematically illustrates one example of an exhaust system according to the subject disclosure.

FIG. 1 shows a vehicle exhaust system 10 that conducts hot exhaust gases generated by an engine 12 through various exhaust components to reduce emission and control noise as known. In one example configuration, at least one pipe 14 directs engine exhaust gases exiting an exhaust manifold of the engine 12 into one or more exhaust gas aftertreatment components. In one example, the exhaust gas aftertreatment components include a diesel oxidation catalyst (DOC) 16, and an optional diesel particulate filter (DPF) 18 that is used to remove contaminants from the exhaust gas as known.

Downstream of the DOC 16 and optional DPF 18 is a selective catalytic reduction (SCR) catalyst 22 having an inlet 24 and an outlet 26. Optionally, component 22 can comprise a catalyst that is configured to perform a selective catalytic reduction function and a particulate filter function. The outlet 26 from the SCR 22 communicates exhaust gases to downstream exhaust components 28 and the exhaust gas eventually exits to atmosphere via a tailpipe 20. The various downstream exhaust components 28 can include one or more of the following: pipes, filters, valves, catalysts, mufflers etc. These exhaust system components can be mounted in various different configurations and combinations dependent upon vehicle application and available packaging space.

In one example, a mixer 30 is positioned downstream from an outlet of the DOC 16 or DPF 18 and upstream of the inlet 24 of the SCR 22. The DOC/DPF and SCR can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream of the mixer 30.

A control system includes the controller 38 that controls injection of the DEF based on one or more of exhaust gas temperature, backpressure, time, etc. The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory.

The mixer 30 is used to generate a swirling or rotary motion of the exhaust gas. FIGS. 2-5 show the mixer 30 in greater detail. The mixer 30 has an inlet end 40 configured to receive the engine exhaust gases and an outlet end 42 to direct a mixture of swirling engine exhaust gas and products transformed from the injected fluid to the SCR catalyst 22.

Figure 2:
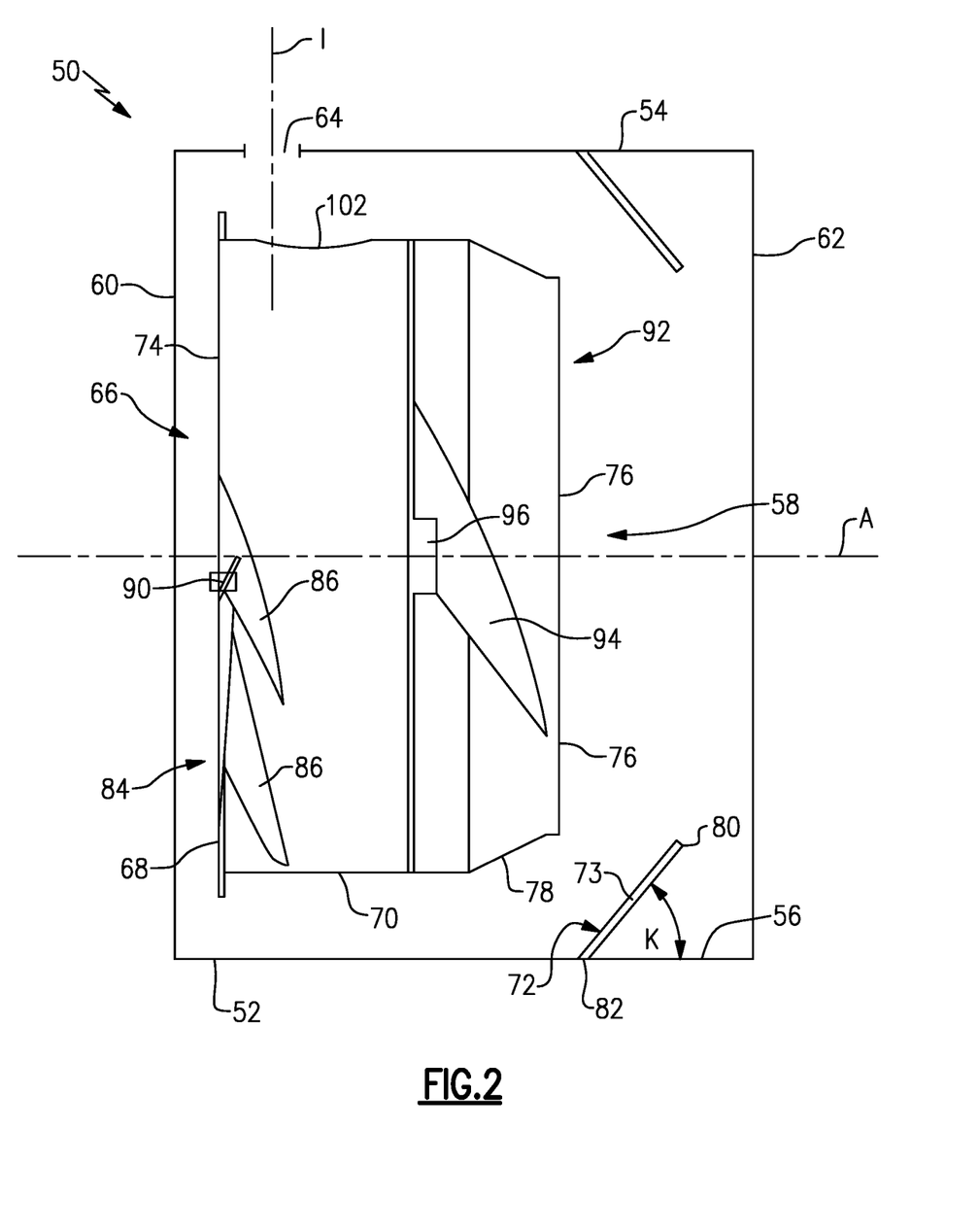
FIG. 2 is a cross-sectional view of a mixer from the system of FIG. 1.

FIG. 2 shows a mixer 50 according to an example embodiment. The mixer 50 includes a mixer housing 52 having an external surface 54 and in internal surface 56 defining an internal cavity 58. The mixer housing 52 has a mixer inlet 60 that receives the exhaust gases into the mixer 50 and a mixer outlet 62 that provides the exhaust gases from the mixer 50. In one example, the mixer inlet 60 receives the exhaust gases from a diesel particulate filter 18 and the mixer outlet 62 provides the exhaust gases to the SCR catalyst 22. The mixer housing 42 includes an injector or doser port 64 through which reductant introduced into the internal cavity 58 to mix with the exhaust gases.

The mixer 50 includes one or more flow devices that segment the mixer 50 into a plurality of stages. Each of the plurality of flow devices is structured to change the flow of the mixture of exhaust gases and reductant so that the flow devices together provide uniform distribution at the mixer outlet 62. Such a flow distribution allows the SCR catalyst to have a high conversion efficiency.

As shown in FIG. 2, the mixer 50 includes a first flow device 66. The port 64 through which reductant is injected faces the first flow device 66. The port 64 defines an injection axis I that is generally perpendicular to a central axis A of the mixer housing 52. In other examples, the injection axis I could be at a non-perpendicular angle relative to the central axis A.

The mixer 50 is scalable in the axial direction, e.g., in length along the axis A, and in the radial direction, e.g., in diameter. By being scalable, the mixer 50 can be utilized in various applications where different lengths and/or diameters are desired in any type of application.

As shown in FIG. 2, the first flow device 66 is shown to include a funneling edge 68, a Venturi body 70, and a louver 72. The louver 72 comprises a separate member from the Venturi body 70, i.e. is free from contact with the Venturi body 70, and extends inwardly toward the axis A from the internal surface 56 of the mixer housing 52. The funneling edge 68 is contiguous with the Venturi body 70. The funneling edge 68 is formed to direct a majority of the exhaust gases from the mixer inlet 60 into the Venturi body 70. The funneling edge 68 also allows a portion of the exhaust gases to initially circumvent the Venturi body 60 and enter a region between the first flow device 66 and the mixer 50. The funneling edge 68 can have various angles relative to the center axis A of the mixer 50. For example, the angles can include ninety degrees, forty-five degrees, thirty degrees, fifteen degrees, etc. Additionally, the funneling edge 68 can have various heights relative to an outer diameter of the body. By adjusting the height of the funneling edge 68, more or less of the exhaust gases can be directed into the first flow device 66 and more or less of the exhaust gases can be directed around the first flow device 66.

The Venturi body 70 includes a body inlet 74 and a body outlet 76. The body inlet 74 receives the exhaust gases from the mixer inlet 60. The funneling edge 68 is at the body inlet 74 and is spaced apart from the inner surface 56 of the mixer housing 52 in a radial direction. In one example, the funneling edge 68 extends in a direction that is perpendicular to the central axis A. In one example, the louver 72 is at the body outlet 76 and is at an offset angle K from the internal surface 56 of the mixer housing 52. In one example, the offset angle K is between 40 and 60 degrees.

In one example, the louver 72 comprises a substantially planar body 73 that is at an angle relative to the internal surface 56 and extends between first 80 and second 82 edges or ends. The second edge/end 82 is fixed to the internal surface 56 of the mixer housing 52. The body 73 extends radially inwardly from the second edge/end 82 at the internal surface 56 to the first edge/end 80 that is free from contact with any other structure. The body 73 extends along a generally linear path between the first 80 and second 82 ends at the offset angle K as shown in FIG. 2. The louver 72 may further comprise a conic ring or other support structure to better support the louver 72 in manufacturing and operation. The conic ring would have a radially inner perimeter at the first edge 80 and a radially outer perimeter at the second edge 82.

While the louver 72 is shown to be substantially linear, the louver 72 may have subsections that change in direction, thickness, and angle away from the mixer housing 52, such that the louver 72 is angled away from the Venturi body 70 and does not intersect the Venturi body 70.

In one example, the first edge or end 80 of the louver 72 is downstream of the second edge or end 82 of the louver 72 as defined by the offset angle K. In one example, the second end 82 is aligned in a radial direction with the body outlet 76 of the Venturi body 70, and the first end 80 is aligned in an axial direction with the body outlet 76. Optionally, the second end 82 could be moved upstream or downstream relative to the body outlet 76. Optionally, the louver 72 could be lengthened such that the first end 80 is radially inward relative to the body outlet 76, or the louver 72 could be shortened such that the first end 80 is radially outward relative to the body outlet 76.

The Venturi body 70 may be circular, conical, frustoconical, aerodynamic, or other similar shapes. The louver 72 functions to direct flow along the flow device 66 through the mixer 50. In various embodiments, the louver 72 provides a directed path for gases to flow between the Venturi body 70 and the mixer 50 such that exhaust gases may pass through or circumvent the louver 72 and redirect the exhaust gas flow. With the louver 72, the flow is redirected in a less turbulent way. However, as explained in more detail herein, the louver 72 in some embodiments has apertures through which a portion of the exhaust gases may pass to pass through the louver 72.

While the louver 72 is shown in the Figures as substantially straight, in alternative embodiments, the path between the first 80 and second 82 ends of the louver 72 may be curved or otherwise, creating a concave or convex louver 72. The change in angle along the first louver 72 would similarly change the flow path of exhaust gases that pass through the first flow device 66.

Figure 4:
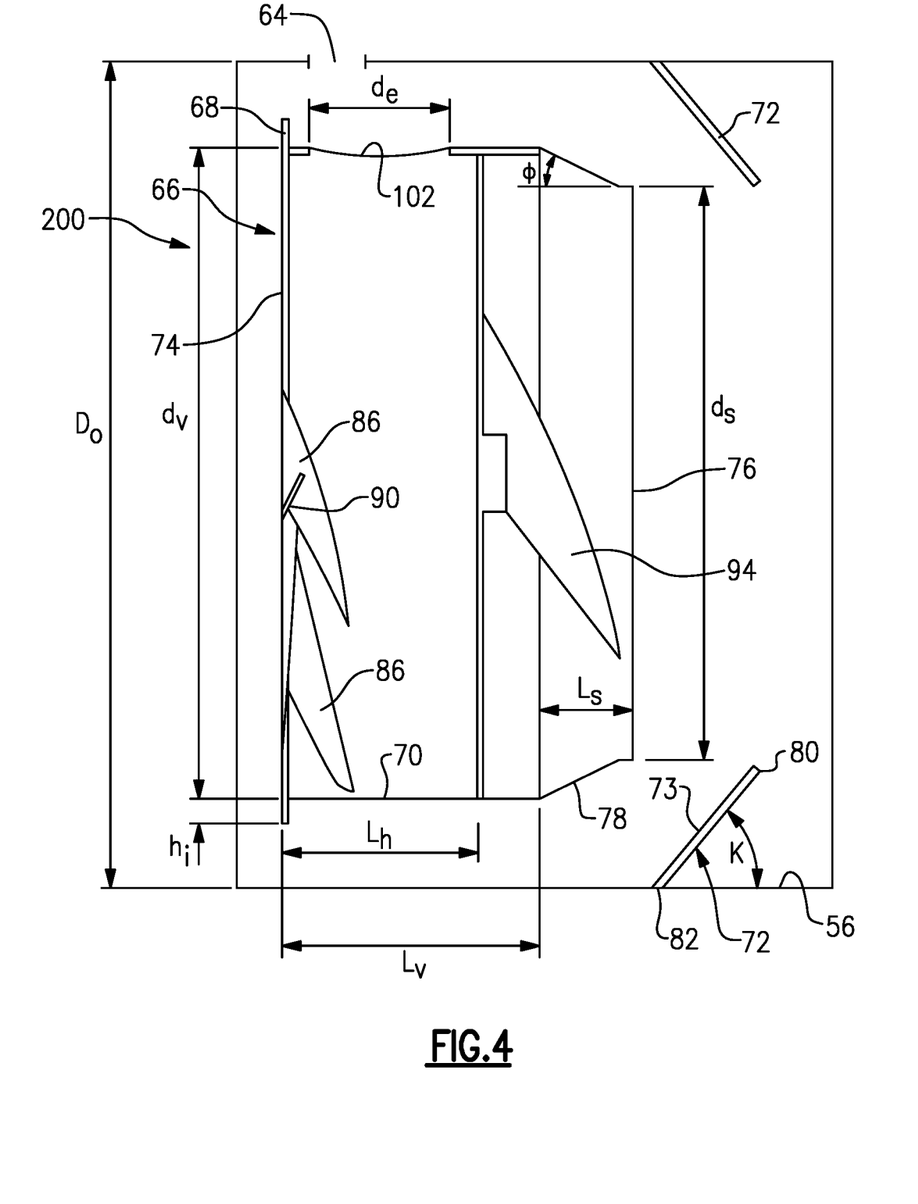
FIG. 4 is a cross-sectional view similar to FIG. 2, but additional features.

According to various embodiments, the diameter of the Venturi body 70 is:

$$0.25D_0 \leq d_V \leq 0.9D_0$$

where the Venturi body 70 is defined by a diameter $d_V$ and the mixer 50 is defined by an inner diameter Do greater than $d_V$ (FIG. 4). The static pressure measured at the Venturi body 70 is given by $$P_C = P_0 - ((D_0/d_V)^4 - 1)*(1/2)\rho v_0^2$$

where PC is the absolute static pressure at the Venturi body 70, where P0 is the absolute static pressure upstream of the Venturi body 70 (e.g., as measured by a pressure transducer, as measured by a sensor, etc.), where $\rho$ is the density of the exhaust gases, and where $v_0$ is the flow velocity upstream of the Venturi body 70 (e.g., as measured by a sensor, etc.). Due to the difference is diameter between the Venturi body 70 and the mixer 50, the Venturi body 70 creates a low-pressure region. The low-pressure region enhances decomposition of reductant, ordinary and turbulent diffusion, and mixing of reductant droplets.

Figure 3:
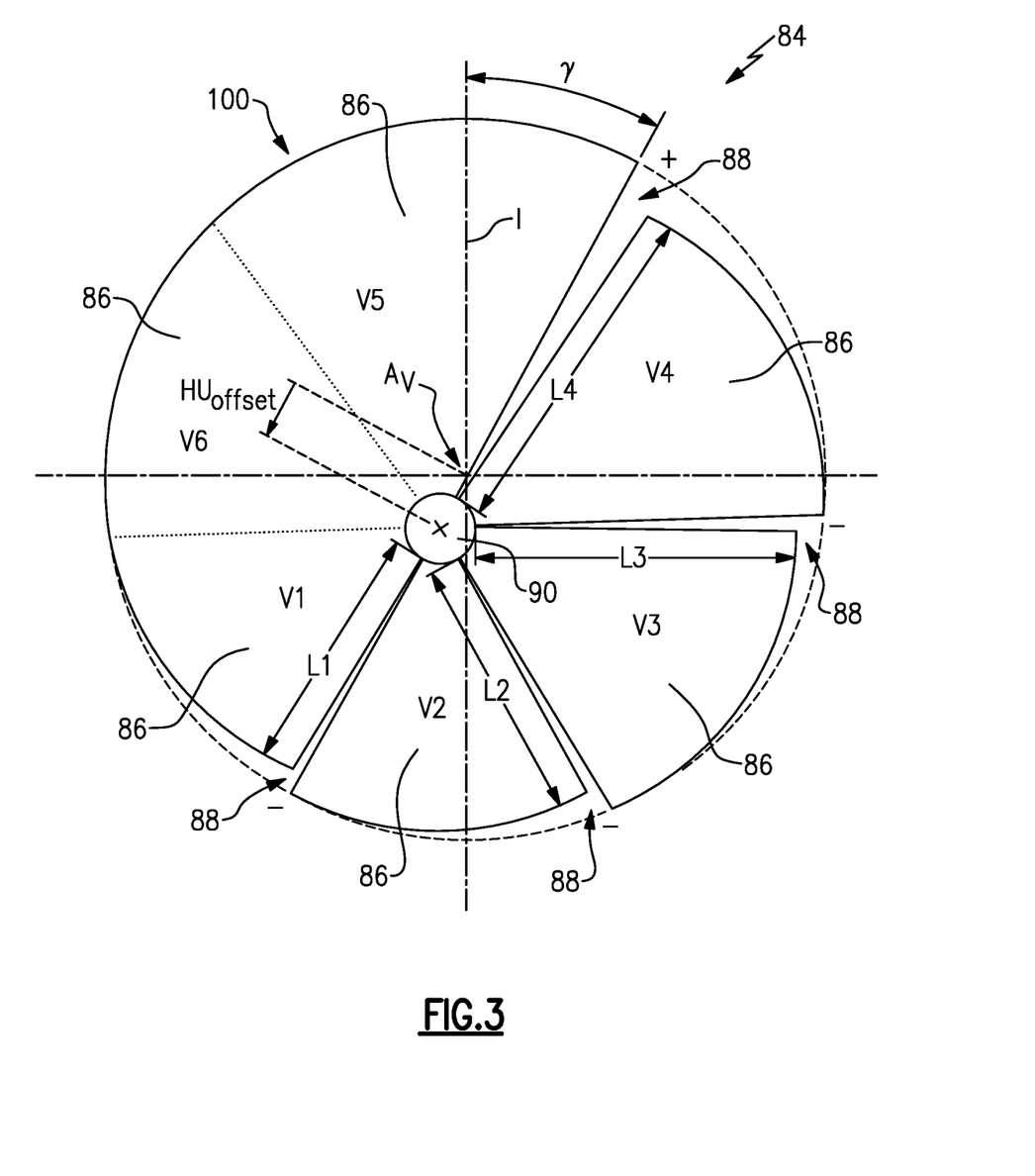
FIG. 3 is front view of the mixer of FIG. 2.

The first flow device 66 also includes an upstream mixer 84 having a plurality of upstream vanes 86 and a plurality of upstream vane apertures 88 as shown in FIG. 3. The apertures 88 are interspaced therebetween to provide a swirl flow thereby creating additional low pressure regions and facilitating mixing by elongating a mixing trajectory of the first flow device 66. The upstream mixer 84 is configured to receive the exhaust gases from the mixer inlet 60 and to provide the exhaust gases into the Venturi body 70. The upstream vanes 86 are also attached to and conform to an upstream vane hub 90 that is radially offset from the center axis of the Venturi body 70. The radial offset creates vanes which are variable in geometry, as the radial distance from the upstream vane hub 90 to the Venturi body 70 differs depending on the radial direction. The offset can be in the range of $$0 \leq HU_{offset} \leq 0.25d_V$$

where $d_V$ is the Venturi diameter and $HU_{offset}$ is the radial offset of the upstream vane hub center from the Venturi center axis, respectively from the mixer center axis, as shown in FIG. 3.

The individual angles may be varied as well to obtain the desired flow split between different vanes. The variable geometry vane design can be optimized to preferentially redirect flow to increase droplet trajectory and thereby improving the mixing of the reductant droplets with the exhaust gas as well as achieving high shear velocity on the Venturi walls to minimize the likelihood of deposit (e.g., urea deposit, etc.) formation. Further, these vanes 86 may have curved edges which aid in disrupting flow, thereby minimizing impingement.

The upstream vanes 86 are static and do not move within the Venturi body 70. In this way, the upstream mixer 84 may be less complex to manufacture and less expensive. The upstream vanes 86 provide several openings 88 between adjacent upstream vanes 86, such that each of the upstream vanes 86 independently swirls the exhaust gases and such that the upstream vanes 86 collectively form the swirl flow in the exhaust gases.

The upstream vanes 86 are formed to be curved, angled, bent, etc. and are positioned to cause a swirling flow of the exhaust gases and the reductant to form a mixture. In various embodiments, the upstream vanes 86 are substantially straight (e.g., substantially disposed along a plane, having a substantially constant slope along the upstream vane 86, etc.). In other embodiments, the upstream vanes 86 are curved (e.g., not substantially disposed along a plane, having different slopes along the upstream vane 86, having edges which are curved relative to the remainder of the upstream vane 86, etc.). In still other embodiments, adjacent upstream vanes 86 are positioned so as to extend over one another. In these embodiments, the upstream vanes 86 may be straight and/or curved. In embodiments with multiple upstream vanes 86, each upstream vane 86 may be independently configured so that the upstream vanes 86 are individually tailored to achieve a target configuration of the first flow device 66 such that the mixer 50 is tailored for a target application.

Each of the upstream vanes 86 is defined by a vane angle (e.g., relative to a vane hub center axis, etc.) that is related to the swirl produced by that upstream vane 86. The vane angle may be defined between a vane edge line (e.g. the line co-axial with the radially outermost circumferential edge of the angled part of a vane) and the vane hub center axis. If the vane edge line and the vane hub center axis do not intersect, the vane angle is defined between the vane hub center axis and a plane defined by the vane edge line and a point of intersection of the vane hub center axis with a plane formed by the upstream edges of the vanes. The vane angle for each of the upstream vanes 86 may be different from the vane angle for any of the others of the upstream vanes 86. According to various embodiments, the first flow device 66 includes upstream vanes 86 that have a vane angle of between forty-five and ninety degrees. Similarly, the first flow device 66 may include any number of the upstream vanes 86. In some embodiments, the first flow device 66 includes between four and twelve upstream vanes 86.

The upstream vane apertures 88 collectively define an open area. However, the size of the upstream vane apertures 88 is related to, in part, the diameter of the upstream vane hub 90. According to various embodiments, the diameter of the upstream vane hub 90 is given by $$0.05 d_V \leq D_H \leq 0.25 d_V$$

where DH is the diameter of the upstream vane hub 90. In application, any of the number of the upstream vanes 86, the vane angles of the upstream vanes 86, and the diameter of the upstream vane hub 90 may be varied to optimize improvements in the flow of the exhaust gases and the reductant, the improvements in the mixing of the reductant, and the improvements in minimizing pressure drop. The upstream mixer 84 may be configured such that the upstream vanes 86 are symmetrically or asymmetrically disposed about the upstream vane hub 90.

The first flow device 66 includes a downstream mixer 92 that includes downstream vanes 94. It is understood that the downstream mixer 92 as shown and described with reference to FIG. 2 may be included in any of the embodiments of the mixer 50 discussed herein.

The downstream vanes 94 are attached to a downstream vane hub 96 that is not radially offset from the center axis of the mixer 50. However, the downstream vane hub 96 may optionally also be offset in the range of $$0 \leq HD_{offset} \leq 0.25 d_V$$

where $d_V$ is the Venturi diameter and $HD_{offset}$ is the radial offset of the downstream vane hub center from the Venturi center axis, respectively from the mixer center axis, as shown in FIG. 3. $HD_{offset}$ may have the same amount and the same radial direction as the offset $HU_{offset}$ of the upstream vane hub, however it may also be independent from the offset of the upstream vane hub. This offset again creates vanes which are variable in geometry, as the radial distance from the downstream vane hub to the Venturi body differs depending on the radial direction. The downstream vane hub 96 is coupled to the Venturi body 70. The downstream vanes 94 may be similar to or different from the upstream vanes 86. Tips of each of the downstream vanes 94 may be spaced from the Venturi body 70 by an air gap such that the exhaust gases can pass between the tips of each of the downstream vanes 94 and the Venturi body 70.

The downstream mixer 92 includes a plurality of downstream vane apertures interspaced between the plurality of downstream vanes 94. In this way, the plurality of upstream vanes and the plurality of downstream vane apertures provide a swirl flow within the first flow device 66. The downstream vanes 94 are attached to and conform to the Venturi body 70 such that the exhaust gases can only exit the Venturi body 70 through the downstream vane apertures. The plurality of upstream vane apertures cooperate with the plurality of downstream vanes 94 to provide the exhaust gases into the first flow device 66 with a swirl flow that facilitates mixing of the reductant and the exhaust gases.

In the embodiment shown in FIG. 2, the upstream vanes 86 are located upstream of where the reductant is introduced while the downstream vanes 94 are located downstream of where the reductant is introduced. In this embodiment, the upstream vanes 86 create a first swirl flow in a first direction and the downstream vanes 94 create a second swirl flow in a second direction that may be the same as the first direction or opposite to the first direction.

FIG. 3 shows an example of swirl mixer vanes with different geometries. The vane hub has been moved in the direction of the vane edge of vane V1, thereby creating vanes 86 with vane edges increasing in lengths from vane edge length L1 to vane edge length L4 (moving counter-clockwise). Vane V4 is also bent by a larger angle compared to V1, V2 and V3 thus creating a bigger opening and allowing a higher fraction of the overall flow to go through it. This is depicted in FIG. 3 by the plus symbol "+" (indicating a smaller vane open angle) at the gap between V4 and V5 and the minus symbol "—" (indicating a larger vane open angle) at the gaps between vanes V1 and V2, V2 and V3 and V3 and V4 respectively. The vane angle may be different for each of the vanes of the vane swirl mixer.

FIG. 3 illustrates a combined upstream vane 100 in one embodiment. The combined upstream vane 100 may be formed in a variety of manners. In various embodiments, the combined upstream vane 100 is formed from a large upstream vane 86 which is folded flat (e.g., at a vane angle of ninety degrees, etc.). In these embodiments, the large upstream vane 86 may be twice the size of the other upstream vanes 86. In other embodiments, the combined upstream vane 100 is formed from a first upstream vane V5 and a second adjacent and contiguous upstream vane V6. In these embodiments, the first adjacent upstream vane V5 and the second adjacent upstream vane V6 each have a vane angle of ninety degrees and then the first adjacent upstream vane V5 and the second adjacent upstream vane V6 are either joined directly (e.g., adjacent edges of each of the first adjacent upstream vane V5 and the second adjacent upstream vane V6 are attached together, etc.) or indirectly (e.g., a spanning member is attached to each of the first adjacent upstream vane V5 and the second adjacent upstream vane V6, etc.).

The vane edges may further be at an angle γ to a doser injection axis I that is directed towards the center of the Venturi, the angle γ being defined between the doser injection axis I and the radial edge of a vane which is circumferentially nearest. The angle γ can be between ±360/2n, where n is the number of vanes (counting both open and closed vanes). In the embodiment illustrated in FIG. 3 the angle γ is defined between the doser injection axis I and the edge of vane V5 nearest to the doser injection axis. In a vane swirl mixer with n=6, as depicted in FIG. 3, the angle γ can be between −30 degrees (counter-clockwise direction in FIG. 3) and +30 degrees (clockwise direction in FIG. 3). For the sake of calculation, combined vanes may always be regarded as individual closed vanes, similar to the vanes V5 and V6 depicted in FIG. 3.

FIG. 4 illustrates a cross-sectional view of the mixer 50. The upstream mixer 84 is located upstream of the port 64. The upstream mixer 84 functions to create a swirl flow of the exhaust gases within the first flow device 66 downstream the upstream mixer 84. The swirl flow created by the upstream mixer 84 facilitates distribution of the reductant in the exhaust gases between the upstream mixer 84 and the downstream vanes 94 such that the reductant is substantially evenly distributed within the exhaust gases when the exhaust gases encounter the downstream vanes 94.

The Venturi body 70 is defined by a body center axis Av. The Venturi body 70 is centered on (e.g., a centroid of the Venturi body 70 is coincident with, etc.) the body center axis Av. The upstream vane hub 90 is centered on an offset axis $h_r$. The radial offset $HU_{offset}$, as can be seen in FIG. 3, of the offset axis $h_r$ causes any reductant build up on the Venturi body 70 to be substantially redistributed to the exhaust gases downstream of the first flow device 66. While the offset axis $h_r$ is offset from the Venturi center axis Av away from the aperture by the radial offset $HU_{offset}$ in FIG. 4, it is understood that the offset axis $h_r$ may be offset from the Venturi center axis Av towards the aperture by the radial offset $HU_{offset}$, or offset from the Venturi center axis Av towards the Venturi body 70 in any radial direction by the radial offset $HU_{offset}$.

The Venturi body 70 has a body inlet 74 and a body outlet 76. The inlet has a diameter $d_V$ and the outlet has a diameter $d_S$ which is typically less than the diameter $d_V$. The diameter $d_V$ and the diameter $d_S$ are each less than the diameter Do of the mixer 50. In various embodiments, the mixer 50 and the first flow device 66 are configured such that $$0.4D_0 \leq d_V \leq 0.9D_0$$

$$0.7d_V \leq d_S \leq d_V$$

$$0 \leq h_r \leq 0.1D_0$$

In various embodiments, the funneling edge 68 radially protrudes from the body inlet 74 towards the mixer 50 a distance $h_r$. In various embodiments, the first flow device 66 is configured such that $$0 \leq h_i \leq 0.1d_V$$

By varying the distance hi, the flows of the exhaust gas into the first flow device 66 and/or the exhaust gas guide aperture may be optimized.

The reductant flows from the port 64 through an exhaust gas guide aperture 102. The exhaust gas guide aperture 102 is generally circular and defined by a diameter de. In various embodiments, the first flow device 66 is configured such that $$d_e = (D_0 - d_V - 2h_r) * \tan((\alpha + \delta)/2)$$

where $$5° \leq \delta \leq 20°$$

where δ is a margin that is selected based on the configuration of the first flow device 66 and where α is a spray angle of a nozzle directing the flow of exhaust gas. In some embodiments the exhaust gas guide aperture 102 is elliptical. In these embodiments, the diameter de may be a major axis (e.g., as opposed to a minor axis, etc.) of the exhaust gas guide aperture 102.

The first flow device 66 is also defined by a spacing Ln between the upstream mixer 84 and the downstream mixer 92. The spacing Ln can be a fixed distance between the upstream mixer and the downstream mixer independent of the diameter Do of the mixer 50 and the inlet diameter $d_V$ or the outlet diameter $d_S$. This allows for a wide range of scaling options of the mixer diameters while keeping the overall length of the mixer 50 minimal. Previous exhaust gas mixers were not able to scale the diameter of the exhaust gas mixer independently of the mixer length. This allows for an increased exhaust gas mixer diameter without increasing the length required to fit the vane swirl mixer within the exhaust unit. The diameter Do of the mixer 50 and the Venturi inlet diameter $d_V$ can be changed based on the space claim and the performance targets of the application. The diameter Do of the mixer 50 may range from 8 inches (20.32 cm) to 15 inches (38.1 cm) while the Venturi inlet diameter $d_V$ may range from 2 inches (5.08 cm) to 13.5 inches (34.29 cm) while keeping the spacing $L_n$ a constant.

The Venturi body 70 includes a shroud 78. It is understood that the shroud 78 as shown and described with reference to FIG. 4 may be included in any of the embodiments of the mixer 50 discussed herein.

The shroud 78 defines a downstream end of the Venturi body 70 and is therefore defined by the diameter $d_S$. In various embodiments, the shroud 78 is cylindrical or conical (e.g., frustoconical, etc.) in shape. The shroud 78 may facilitate a reduction in stratification of the exhaust gases that occurs from centrifugal force created by the downstream mixer 92. Additionally, the shroud 78 may provide structural support to the downstream mixer 92, such as when the downstream vanes 94, in addition to the downstream vane hub 96, are attached to the shroud 78. The shroud 78 is defined by an angle Φ relative to an axis parallel to the Venturi center axis Av and the mixer center axis. In various embodiments, the first flow device 66 is configured such that $$\Phi \leq 50°$$

Being so angled, the angle M is greater than (90−Φ).

In some embodiments, at least one of the flow devices of the mixer 50 is angled relative to the mixer center axis. For example, the first flow device 66 may be configured such that the Venturi center axis Av is tilted up from (e.g., angled at a positive angle relative to, etc.) the mixer center axis or such that the Venturi center axis Av is tilted down from (e.g., angled at a negative angle relative to, etc.) the mixer center axis.

The upstream vanes 86 may be spaced from the Venturi body 70 by a gap g. In various embodiments, the first flow device 66 is configured such that $$0 \leq g \leq 0.15d_V$$

The gap g may mitigate accumulation of reductant deposits on the Venturi body 70. The gap g functions to create a substantially axial flow of exhaust gases directed along the Venturi body 70 (e.g., on the inner surfaces of the Venturi body 70, etc.). In this way, the gap g may balance flow (e.g., a main tangential flow, etc.) of the exhaust gases through the upstream vanes 86 with the aforementioned axial flow and a flow of the exhaust gases around the first flow device 66. Instead of, or in addition to, the gap g, the upstream vanes 86 may include slots or holes through which the exhaust gases may flow.

In FIG. 4, the downstream vanes 94 are shown in contact with the shroud 78 such that no gap exists between at least a portion of each of the downstream vanes 94 and the shroud 78. In some embodiments, the downstream vanes 94 may be spaced from the shroud 78 by a gap $g_v$. In various embodiments, the first flow device 66 is configured such that $$0 \leq g_v \leq 0.15d_V$$

The gap $g_v$ may mitigate accumulation of reductant droplets on the shroud 78. The gap gv functions to create a substantially axial flow of exhaust gases directed along the shroud 78 (e.g., on inner surfaces of the shroud 78, etc.). Instead of, or in addition to, the gap $g_v$, the downstream vanes 94 may include slots or holes through which the exhaust gases may flow.

In some embodiments, the tip of each of the upstream vanes 86 is attached (e.g., welded, coupled, etc.) to the Venturi body 70. Each of the upstream vanes 86 is defined by an upstream vane angle relative to an upstream vane hub center axis of the upstream vane hub 90 of the upstream vanes 86. Similarly, the downstream vane angle for each of the downstream vanes 94 is defined relative to a downstream vane hub center axis of the downstream vane hub 96. The upstream vane angle for each of the upstream vanes 86 may be different from the upstream vane angle for any of the others of the upstream vanes 86. In various embodiments, the upstream vane angle for each of the upstream vanes 86 is between forty five degrees and ninety degrees, inclusive, relative to a downstream vane hub center axis of the downstream vane hub 96 and the downstream vane angle for each of the downstream vanes 94 is between forty five degrees and ninety degrees, inclusive.

The upstream vane angle may be different for each of the upstream vanes and the downstream vane angle may be different from each of the downstream vanes.

Figure 5:
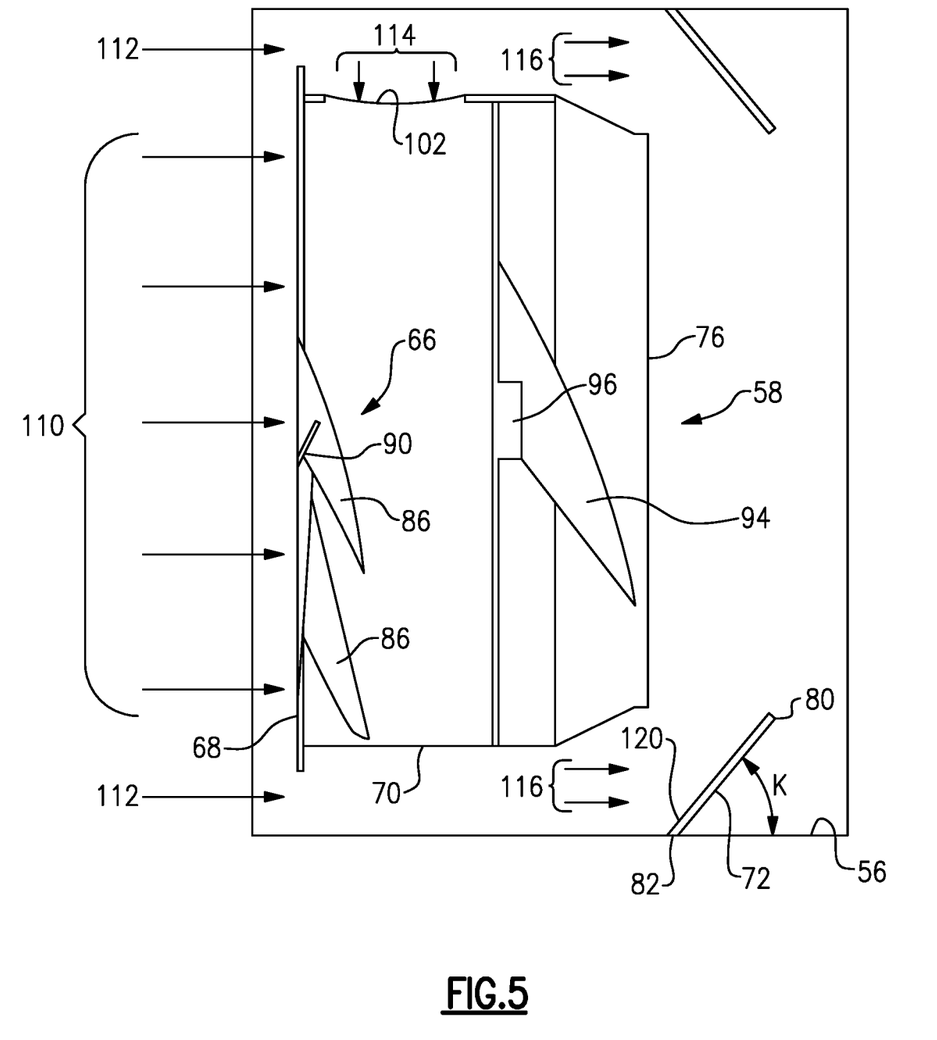
FIG. 5 is a cross-sectional view of another example of a mixer.

FIG. 5 illustrates the flow of exhaust gases within the mixer 50 and illustrates how the exhaust gases behave when encountering the first flow device 66. The exhaust gases upstream of the first flow device 66 are divided into a main flow 110 and a circumvented flow 112. The main flow 110 is provided into the first flow device 66.

In some embodiments, the circumvented flow 112 is 5-40%, inclusive, of the sum of the circumvented flow 112 and the main flow 110 (e.g., the total flow, etc.). In these embodiments, the main flow 110 is 60-95%, inclusive, of the sum of the circumvented flow 112 and the main flow 110 (e.g., the total flow, etc.). Accordingly, where the mixer 50 includes six upstream vanes 86, each gap between adjacent upstream vanes 86 receives 6-16%, inclusive, of the sum of the circumvented flow 112 and the main flow 110 (e.g., the total flow, etc.).

The main flow 110 and the circumvented flow 112 define a flow split. The flow split is a ratio of the circumvented flow 112 to the main flow 110, represented as a percentage of the main flow 110. The flow split is a function of the diameter $d_V$, the diameter $d_e$, and the distance $h_i$. By varying the flow split, an optimization of target mixing performance (e.g., based on a computational fluid dynamics analysis, etc.) of the first flow device 66, target deposit formation (e.g., a target amount of deposits formed over a target period of time, etc.), and target pressure drop (e.g., a comparison of the pressure of the exhaust gases upstream of the first flow device 66 and a pressure of the pressure of the exhaust gases downstream of the first flow device 66, etc.), can be performed such that the first flow device 66 can be tailored for a target application. In various embodiments, the flow split ratio is between five percent and seventy percent, inclusive. That is, the circumvented flow 112 is between five percent and seventy percent, inclusive, of the main flow 110.

The circumvented flow 112 is divided into a diverted flow 114 and an isolated flow 116. The diverted flow 114 is mixed with the reductant provided to the first flow device 66 through the port 64. For example, the circumvented flow 112 may enter the Venturi body 70 as the diverted flow 114 directly through the exhaust gas guide aperture 102. The isolated flow 116 bypasses the aperture 102 in the Venturi body 70 and flows along the internal surface 56 until the flow 116 contacts an upstream surface 120 of the louver 72. The flow 116 is then directed in a radially inward direction along a path defined by the offset angle K to mix with the mixture of reductant and exhaust gas exiting the body outlet 76 of the Venturi body 70.

According to the embodiment shown in FIG. 5, the main flow 110 is passed through the upstream vanes 86, mixed with reductant and the diverted flow 114, and then passed through the downstream vanes 94, through the shroud 78, and out of the body outlet 76.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A mixer for a vehicle exhaust gas system, the mixer comprising:
   a mixer housing defining an internal cavity and having a mixer inlet configured to receive exhaust gas and a mixer outlet to direct exhaust gas to downstream exhaust components:
   a flow device configured to receive the exhaust gas from the mixer inlet and facilitate mixing of the exhaust gas and a reductant introduced into the flow device;
   wherein the flow device comprises a Venturi body centered on a body center axis, and wherein the Venturi body comprises
   a body inlet configured to receive the exhaust gas from the mixer inlet, and
   a body outlet configured to provide the exhaust gas to the mixer outlet,
   a louver extending from an internal surface of the mixer housing to a distal edge that is downstream of the body outlet,
   an upstream vane positioned within the Venturi body proximate the body inlet and coupled to an upstream vane hub that is centered on an upstream vane hub axis, and
   a downstream vane positioned within the Venturi body proximate the body outlet and coupled to a downstream vane hub that is centered on a downstream vane hub axis,
   and
   wherein at least one of:
   the upstream vane hub axis is radially offset from the body center axis by an offset distance; or
   the downstream vane hub axis is radially offset from the body center axis by an offset distance.

2. The mixer according to claim 1, wherein the flow device includes a funneling edge at the body inlet that is spaced apart from the internal surface of the mixer housing in a radial direction, and wherein the funneling edge is configured to direct a majority of the exhaust gases from the mixer inlet into the Venturi body.

3. The mixer according to claim 2, wherein the funneling edge extends in a direction that is perpendicular to the body center axis, and wherein the louver is at an offset angle relative to the internal surface of the mixer housing.

4. The mixer according to claim 3, wherein the offset angle is between 40 and 60 degrees.

5. The mixer according to claim 3, wherein the flow device includes a shroud at the body outlet, and wherein the louver is free from contact with the shroud.

6. The mixer according to claim 5, wherein the louver has a first edge that is fixed to the internal surface of the mixer housing and extends to the distal edge that is downstream of the body outlet.

7. The mixer according to claim 6, wherein the first edge is aligned in a radial direction with the body outlet, and wherein the distal edge is aligned with the body outlet in an axial direction.

8. The mixer according to claim 1, wherein the louver has a first edge that is fixed to the internal surface of the mixer housing and extends to the distal edge that is downstream of the body outlet, and wherein the first edge is aligned in a radial direction with the body outlet, and wherein the distal edge is aligned with the body outlet in an axial direction.

9. A mixer for a vehicle exhaust gas system, the mixer comprising:
a mixer housing defining an internal cavity and having a mixer inlet configured to receive exhaust gas and a mixer outlet to direct exhaust gas to downstream exhaust components:
a flow device configured to receive the exhaust gas from the mixer inlet and facilitate mixing of the exhaust gas and a reductant introduced into the first flow device;
wherein the flow device comprises a Venturi body centered on a body center axis, and wherein the Venturi body comprises
a body inlet configured to receive the exhaust gas from the mixer inlet,
a body outlet configured to provide the exhaust gas to the mixer outlet,
a louver extending in a downstream direction away from the Venturi body at a non-perpendicular angle from an internal surface of the mixer housing, and
an upstream vane positioned within the Venturi body proximate the body inlet and coupled to an upstream vane hub that is centered on an upstream vane hub axis and radially offset from the body center axis by an offset distance, the first upstream vane configured to facilitate swirling of the exhaust gas within the Venturi body.

10. The mixer according to claim 9, including a downstream vane positioned within the Venturi body proximate the body outlet and coupled to a downstream vane hub that is centered on a downstream vane hub axis.

11. The mixer according to claim 9, wherein the louver extends from the internal surface of the mixer housing at the non-perpendicular angle which is between 40 and 60 degrees.

12. The mixer according to claim 9, wherein the flow device includes a funneling edge at the body inlet that is spaced apart from the internal surface of the mixer housing in a radial direction, and wherein the funneling edge is configured to direct a majority of the exhaust gases from the mixer inlet into the Venturi body.

13. The mixer according to claim 12, wherein the funneling edge extends in a direction that is perpendicular to the body center axis, and wherein the non-perpendicular angle is between 40 and 60 degrees.

14. The mixer according to claim 12, wherein the flow device includes a shroud at the body outlet, and wherein the louver is free from contact with the shroud.

15. The mixer according to claim 14, wherein the louver has a first edge that is fixed to the internal surface of the mixer housing and a second edge that is free from contact with the shroud, and wherein the second edge is downstream of the first edge.

16. The mixer according to claim 9, wherein the louver has a first edge that is fixed to the internal surface of the mixer housing and extends to the distal edge that is downstream of the body outlet, and wherein the first edge is aligned in a radial direction with the body outlet, and wherein the distal edge is aligned with the body outlet in an axial direction.

17. A mixer for a vehicle exhaust gas system, the mixer comprising:
a mixer housing defining an internal cavity and having a mixer inlet configured to receive exhaust gas and a mixer outlet to direct exhaust gas to downstream exhaust components:
a flow device configured to receive the exhaust gas from the mixer inlet and facilitate mixing of the exhaust gas and a reductant introduced into the first flow device;
wherein the flow device comprises a Venturi body centered on a body center axis, and wherein the Venturi body comprises
a body inlet configured to receive the exhaust gas from the mixer inlet,
a body outlet configured to provide the exhaust gas to the mixer outlet,
a louver extending from the mixer housing at a non-perpendicular angle from an internal surface of the mixer housing,
a downstream vane positioned within the Venturi body proximate the body outlet and coupled to a downstream vane hub that is centered on a downstream vane hub axis and is radially offset from the body center axis by an offset distance, the downstream vane configured to facilitate swirling of the exhaust gas downstream of the body outlet.

18. The mixer according to claim 17, including an upstream vane positioned within the Venturi body proximate the body inlet and coupled to an upstream vane hub that is centered on an upstream vane hub axis.

19. The mixer according to claim 17, wherein the louver extends from a first edge that is fixed to the internal surface of the mixer housing at the non-perpendicular angle relative to the internal surface of the mixer housing to a second edge that is downstream relative to the first edge and is free from contact with the Venturi body.

20. The mixer according to claim 17, wherein the flow device includes a funneling edge at the body inlet that is spaced apart from the internal surface of the mixer housing in a radial direction, and wherein the funneling edge is configured to direct a majority of the exhaust gases from the mixer inlet into the Venturi body, and wherein the flow device includes a shroud at the body outlet, and wherein the louver is free from contact with the shroud.

21. The mixer according to claim 20, wherein the funneling edge extends in a direction that is perpendicular to the body center axis, and wherein the non-perpendicular angle is between 40 and 60 degrees.

22. The mixer according to claim 20, wherein the louver has a first edge that is fixed to the internal surface of the mixer housing and a second edge that is downstream of the first edge, and wherein the first edge is aligned in a radial direction with the body outlet, and wherein the distal edge is aligned with the body outlet in an axial direction.

23. The mixer according to claim 17, wherein the louver has a first edge that is fixed to the internal surface of the mixer housing and extends to the distal edge that is downstream of the body outlet, and wherein the first edge is aligned in a radial direction with the body outlet, and wherein the distal edge is aligned with the body outlet in an axial direction.

24. The mixer according to claim 17, wherein the louver extends from the internal surface of the mixer housing to a distal edge that is downstream of the body outlet.

* * * * *